Figure 4:
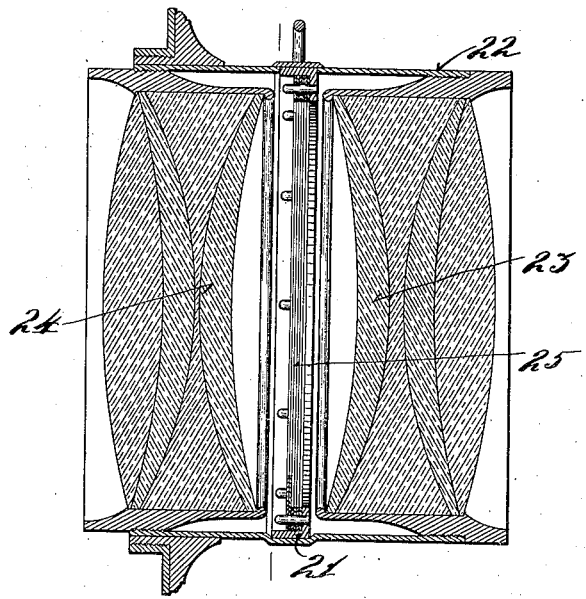

E. A. HOWLAND.
PHOTOGRAPHIC APPLIANCE.
APPLICATION FILED JULY 13, 1911.
1,127,763.
Patented Feb. 9, 1915.
2 SHEETS—SHEET 1.
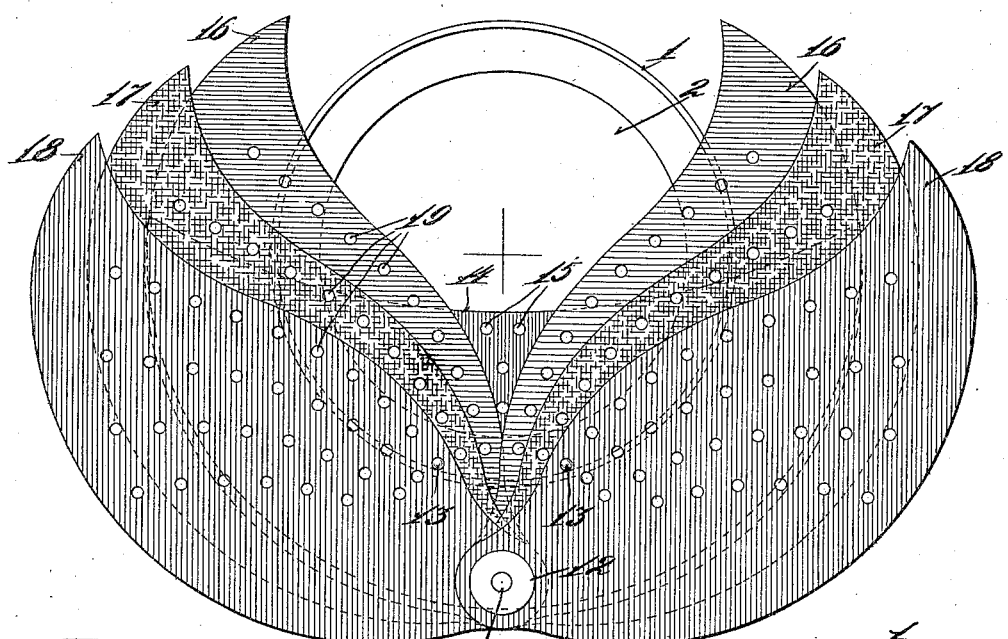
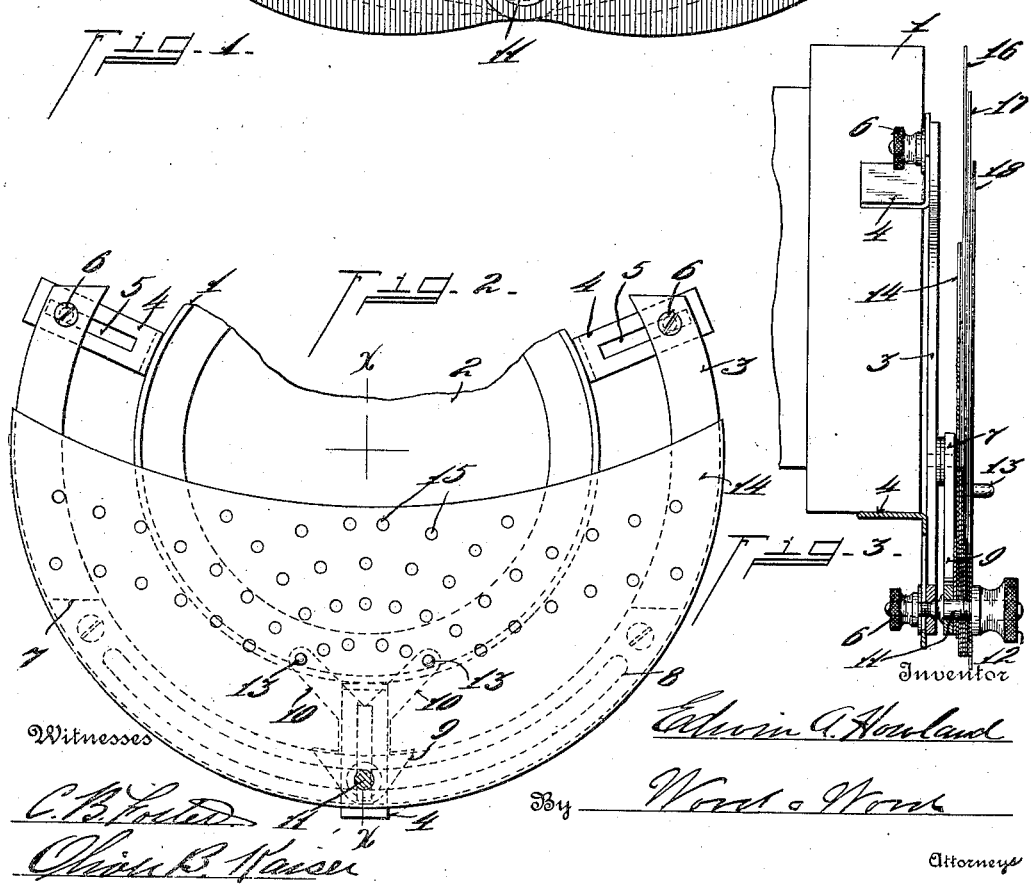

E. A. HOWLAND.
PHOTOGRAPHIC APPLIANCE.
APPLICATION FILED JULY 13, 1911.

1,127,763.

Patented Feb. 9, 1915.
2 SHEETS—SHEET 2.

Witnesses

Inventor
Edwin A. Howland
By Ward & Ward
Attorneys

UNITED STATES PATENT OFFICE.

EDWIN A. HOWLAND, OF CINCINNATI, OHIO.

PHOTOGRAPHIC APPLIANCE.

1,127,763.  Specification of Letters Patent.  Patented Feb. 9, 1915.

Application filed July 13, 1911. Serial No. 638,417.

*To all whom it may concern:*

Be it known that I, EDWIN A. HOWLAND, a citizen of the United States, residing at Cincinnati, in the county of Hamilton and State of Ohio, have invented certain new and useful Improvements in Photographic Appliance, of which the following is a specification.

My invention relates to a color filter for photographic work.

The principal object of the invention is to provide a camera attachment comprising a plurality of transparent members of predetermined colors relatively adjustable, to regulate the character of light passing to the sensitized plate surface through the lens.

My color filter is especially adapted for portraiture photographic work, to bring out distinctly and in their proper relative gradations, the color effects of the object, as well as minutely detailing the physical characteristics. For instance, in a non-retouched photograph of a subject wearing a white lace dress, the lace-work would not be defined owing to the intensely actinic rays affecting the sensitized plate more actively and intensely than the non-actinic rays. With my invention these actinic rays are intercepted by properly selected screen members, and modified, or lowered, so as to bring out these physical details with distinctness and fidelity.

My invention comprises a series of transparent different colored shield members, preferably pivotally connected for relative adjustment, the colors being selected to produce the desired modifications.

The pivotal point is disposed below or to one side of the axial line of the lens, and the shields diverge upon either side of said line, the shield members being grouped to form a color field of selected character intercepting a predetermined portion of the light passing through the lens.

The shields overlap so that the color treatment of the light may be selected with reference to the colors and physical characteristics of the subject, enabling a production of a desired, predetermined effect. The divergence of the shield relative to the axial line of the lens may be adjusted to only intercept the rays transmitted from the dress of the subject, while the rays, say from the face, will pass directly between the shield members approximately in the axial line of the lens, thereby acting more quickly or more directly on the sensitized plate surface than those rays intercepted and subdued or suppressed by the screen members. The lights, shades and relative color values of the object will be toned by the interception through the screen so as to reproduce in the picture and on a proper relative scale the original gradations of color effect, and at the same time, the actinic rays will be sufficiently lowered in value to minutely bring out the details of the physical characteristics of that portion of the object from which such actinic rays emanate.

The disposition, adjustability, and colors of the independent screens, permit each distinct color of the subject to be appropriately and independently treated, with the result of a faithful reproduction of these artistic values lost in ordinary photographic work. For instance, if the subject be a man with a complexion requiring specific handling, the two inner screens, that is, those nearest the axial line of the lens, may be selected to produce the desired modifications. The rays from the face, as explained, do not pass through the screen members but between them, but color modifications may nevertheless be produced because of the focusing of the rays upon the inner lens and a diverging thereof upon the plate, thus producing a blending or diffusing of colors on the plate relative to those rays which are not directly intercepted by the shields. The collar of the subject may be white, the shirt one color, his tie another color and his suit still another color, and these different color characteristics may be approximately reproduced in the picture by causing the rays emanating from these different color portions of the subject to be intercepted by and modified by a selected shield adjustment.

Preferably the screens are apertured so that some registry obtains in the overlapped members in any adjusted position, the function of which is to lessen the time that ordinarily would be required for exposure. Preferably the pivotal point of the shields is concentrically adjustable around the axis of the lens which gives a greater range of adjustability as to the selection of the portion of the rays to be intercepted. These screen members are adjustable relative to one another and are adjustable to and from the axis of the lens, so that the greatest possible provision is afforded for adapting the filter to the many varied conditions of work and artistic effect which obtain in commercial photography.

Preferably my filter is disclosed as a circumferential member of the area of the lens and adapted to be attached to the camera and adjusted while in position, but the particular disposition of the filter between the lens, as shown in the drawings, is not essential.

The features of my invention are more fully set forth in the description of the accompanying drawing, forming a part of this specification, in which:—

Figure 5:
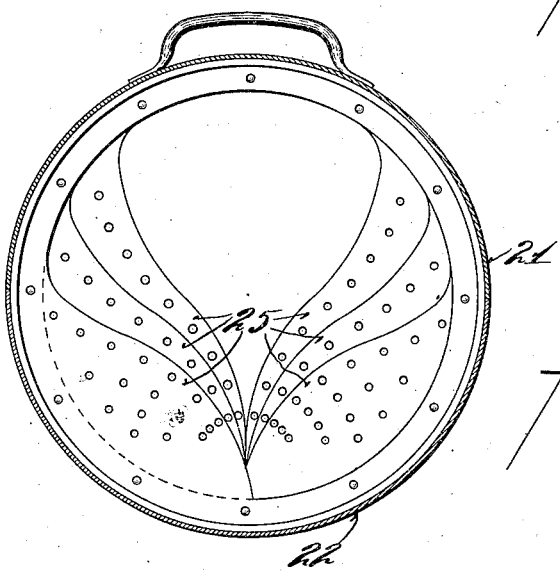

Figure 1 is a front elevation of my improvement as applied to the lens of a camera. Fig. 2 is a front elevation, partly in section, with some of the various shields removed. Fig. 3 is a section on line $x$, $x$, Fig. 2, parts being in elevation. Fig. 4 is a central vertical section through the lens, with my improvement applied between the lens members. Fig. 5 is a section on line $y$, $y$, Fig. 4.

1 represents the casing of the lens, and 2 the lens.

3 represents a circular shaped frame provided with the angle plates 4, for securing the frame 3 to the lens casing. As shown, the angle plates 4 are each provided with a slot 5, through which a clamping bolt 6 projects, whereby the angle plates 4 can be adjustably secured to the frame 3 and gaged according to the diameter of the lens, adapting my improvement to be applied to the various sizes of lens. The frame 3 is provided with a guide plate 7, fixed thereto. Said guide plate is provided with a curved slot 8.

9 represents a slide plate, having the angularly projected limbs 10, said plate being slidably mounted upon the guide plate 7, and 11 represents a screw projected through the slot 8 and slide plate 9, said screw being provided with a nut 12, whereby the slide plate 10 can be shifted and clamped in any adjusted position within the curved slot 8.

13 represents pins fixed to and projecting from the angular limbs or arms 10.

14 represents a crescent-shaped shield, having a perforation through which the screw 11 passes, for mounting the same upon the slide plate, to move therewith, and also, with perforations through which the pins 13 project to hold the shield in position upon the slide plate. The shield is also provided with a plural series of perforations 15, the function of which will be more fully hereinafter described.

16, 17 and 18 represent a series of differently colored leaf-shaped shields pivotally secured to the screw 11, and each provided with perforations 19. These perforations are arranged in symmetry so as to adjust in registry within the relative overlapping shield portions to provide interstices therethrough producing minute non-screened areas. The series of apertures are preferably arranged in arcs relative to the screw 11 which facilitates the registry, pins 13 being provided to fix the shields in a selected position of adjustment. The filter being rotatably adjustable concentric to the axis of the lens enables the intercepting of predetermined rays, but the divergence of the shield members from the pivotal point permits at all times the direct transmission of rays between the screen members in an area approximating the axial line of the lens. The shields are transparent different colored members to produce combination effects upon the intercepted rays, and preferably, the filter comprises the crescent-shaped shield 14 of sepia-red color for modifying intense reds of the object, the leaf shields 16 blue, the shields 17 yellow and the shield 18 of sepia-red, all preferably of a delicate tinge, but obviously with a knowledge of the purposes and functions of this filter, the color scheme can be selected to comprise various or different components from the colors indicated.

By partially shading, or wholly obstructing the light reflected from part of the object through any part of the lens to the photographic plate, the part of the object so shaded from the lens is obscured, or partially obscured, depending upon the density or transparency of the material used in the shields to check the light. By using transparent or semi-transparent material, shaped or adjusted to cover any portion of the lens, except the center or focal point of the same, the greatest volume of light is permitted to enter the lens at the central point, or any other unshaded or shielded portion of the lens. The parts of the object opposite such unshaded portion are most highly lighted and the balance of the object is shaded in proportion to the density of the material used. A series of movable shields of varying, or equal density, or a combination, to form a varying density, and adjusted to cover any part of the lens except the center, produces a photograph strong in light and brilliancy where the lens is uncovered, while the balance of the picture is shaded in proportion to the density of the shields placed in relative combinations. In this respect, therefore, my invention centralizes or directs the light through the lens and gives prominence to such portion of the object as desired by the operator, together with the proper shading or blending of the remainder.

In the employment of colored transparent material, from which the shields are made, the reflected rays are modified subdued or suppressed to produce the best photographic values in their action on the metallic salts of the photographic plate. Red, green, brown and black, or combinations of the same, reflect light in lesser degree than white, blue, gray, yellow, or combinations of the same, and their reflected values have less action in changing the silver salts on the photographic plate. The shades of yellow in the shield do not change the red, green or brown colors, in any way, but reduce the lighter colors to the active value of the red, etc.

When employed as shown in the drawings, the front series of photographic lenses takes up these several combinations of colored light rays produced by the colored shields at any given point, distributes and blends them equally over the whole surface of the rear combination of lenses and by it projects them over the entire surface of the plate or film, correcting all color values of the resulting photographic image, reducing the amount of retouching or hand work, now common in the photographic art, and corrects the contrasts of non-actinic and actinic light rays in flesh and draperies, bringing out the individual fine lines which have heretofore been obscure in photographs.

The perforations in the shields are so arranged in the various sections as to always register more or less, irrespective of their relative adjusted positions, and this permits a certain added volume of light to penetrate through the lens. The perforations permit the violet colored or actinic ray of day-light or electric-light to pass through the lens in certain proportion, and diffusing with the shaded rays, create gradations of details in light and shade in the resulting photograph. My improvement also corrects the visual focus of the lens and especially when used in connection with violet ray electric-light.

In arranging the shields adjustably around the axis of the lens, their height and position may be regulated, so as to admit or retard the passage of light to the lens and to centralize them to the face or other portion of the image, at the selection of the operator. In fact, the reflected rays of the subject photographed are presented to the photographic plate in a value to produce a distinct and natural reproduction in refined tone and artistic effect.

As shown in Fig. 1, the shield 16 is adjusted to a position nearer the axis of the lens than the shields 17 and 18, which will densen the rays at the lower outer peripheral portion of the lens, while a primitive color will be prevailing toward the axis of the lens for certain combinations or reflections of rays of light and color, but the adjustment can be reversed to make a second shield color primitive, by, say inserting the pins 13 in the first perforations of the shields 16 and 17, and in the third perforations of shield 18, which would bring this colored shield closer to the axis of the lens and make its color prevailing at the medial portion of the lens. The device is capable of adjustment universally around the lens axis, radially from the lens axis as to its unit shading area, and divisionally as to an individual color or relative color combination. The slide plate 9 is adjusted upon the guide plate 7 circumferentially with all the movable parts locked in position by the knurled nut 12 screw-threaded upon the screw 11.

While I have shown the leaf-shields as circular in outline upon one edge and undulating, or of French curved outline, along its opposite edge, it will be obvious, that other shapes may be produced with equally efficient results, as the form herein shown is only a preferable construction to illustrate my invention.

In the modification shown in Figs. 4 and 5, the shields are applied within the lens proper, instead of in front of the lens, as shown in Figs. 1, 2 and 3, and this form comprises a disk frame 21, adapted to be removably secured within the tubular lens frame 22, between the lenses 23, 24. 25 represents a series of shields adapted to be adjustably mounted within the frame 21, to produce a range of adjustment in effect substantially the same as that produced in the construction shown in Figs. 1, 2 and 3. These shields are likewise perforated, the perforations of each shield being adapted to register with corresponding perforations of the remaining shields. The shields 25 are adjusted upon the disk frame 21 by withdrawing the same from the pins projected from the frame and adjusting the same relatively to each other after which they are again inserted upon the pins. These pins can be of any number or the perforations around the shields can likewise be multiplied to govern the degree of adjustment.

It is obvious, that the construction can be variously modified, to be employed in connection with the various types of lenses used in photography, without departing from the features of my invention; as the essential characteristic of the appliance, irrespective of its particular form of construction, is in providing means for changing or modifying the actinic value of reflected rays to the photographic plate, without increasing the time of exposure, and without obstructing the axial focal line of the lens or lenses.

Having described my invention, I claim:—

1. A device of the nature disclosed for photographic work, comprising a colored transparent member disposed before a lens for intercepting rays to modify their photographic value exposing a gibbous area of the lens in which the axis of the lens is included, said member being apertured symmetrically.

2. A device of the nature disclosed, for photographic work, comprising a transparent colored and apertured medium disposed to intervene the object and lens, to partially eclipse the circumferential area of the lens, and approximately less than one-half thereof, and not including the lens axis, and transferable radially around the lens axis.

3. A device of the nature disclosed for photographic work, comprising a holder supported upon the lens circumference, a plural series of colored transparent mediums pivotally mounted upon the holder, upon each side of a diametric lens line with their pivot in an axial line of the lens beyond its circumference, to eclipse the lens area from such lens line as a center not including the lens axis, said mediums independently adjustable toward and from the lens axis, to definite correlative positions, each medium apertured with the apertures in registry of overlapping portions of the members of the series.

4. A device of the nature disclosed for photographic work, comprising a series of colored transparent mediums diverging from a point disposed in a diametric line of the lens, and adjustable in a minor field of the lens upon either side of a diametric lens line with a constant exposure of the lens axis.

5. A device of the nature disclosed for photographic work comprising two series of differently colored transparent mediums, each series eclipsing a portion of the lens area not including the lens axis and opposed relatively upon each side of a lens bisecting axial line, and adjustable to increase or diminish its eclipsing area within a minor field of the lens, each medium apertured with the apertures in registry of overlapping portions of the members of the series.

6. A device of the nature disclosed for photographic work, comprising two series of colored transparent mediums, each series eclipsing a portion of the lens area not including the lens axis and opposed relatively from a lens bisecting axial line, each medium being apertured symmetrically.

7. A device of the nature disclosed for photographic work comprising a plural series of differently colored transparent mediums, each series eclipsing a portion of the lens area not including the lens axis and opposed relatively upon each side of a lens bisecting axial line, and adjustable to increase or diminish its eclipsing area within a minor field of the lens, each medium being apertured, with the apertures in symmetry for correlative registration.

8. A device of the nature disclosed for photographic work, comprising a multiple series of colored transparent mediums, each series eclipsing a portion of the lens area not including the lens axis, opposed relatively from a lens bisecting axial line, each medium apertured with the apertures in registry of overlapping portions of the members of the series, and collectively circumferentially movable around the lens axis.

9. A device of the nature disclosed, comprising a holder adapted to be clamped upon the lens circumference, a series of different colored transparent members, pivotally supported upon the holder, with the pivot in an axial lens bisecting line beyond its lens circumference, each member being symmetrically apertured, and independently movable and adjustable on the pivot to definite locations, with the apertures of each registering within an overlapping area of the relative members, whereby multiple combinations of color effects can be produced within a minor field of lens area diverging from the lens axis.

10. A device of the nature disclosed, comprising a holder, adapted to be clamped upon the lens circumference, a plural series of different colored transparent members, pivotally supported upon the holder in opposing series, divergent from each side of a diametric line of the lens, each member adjustable toward and from a definite normal position to predetermined positions from the lens axis, and each being symmetrically apertured, for relative registration with those of an overlapping series, and means for moving all of said members circumferentially around the axis.

11. A device of the nature disclosed for photographic work, comprising a plural series of differently colored transparent members, each series eclipsing a portion of the lens area, not including the lens axis, a holder for mounting the members pivotally upon a common axis in relatively opposed series upon both sides of a diametric lens line, with the coincident members of the multiple series adjustable to and from such diametric line, and independently of the members of their series, each member being apertured in symmetric arrangement for registry relatively with adjacent perforations of the respective members of the series and means for collectively circumferentially adjusting the plural series of members concentrically with the lens axis independent of their correlative adjustment.

12. A device of the nature disclosed for photographic work, comprising a plural series of differently colored transparent members, each series eclipsing a portion of the lens area, not including the lens axis, the members of each series disposed adjacently parallel to each other, a holder for mounting the members pivotally upon a common axis in relatively opposed series upon both sides of a diametric lens line, with the members of each series adjustable to and from such diametric line, each member being apertured in symmetric arrangement for registry relatively with adjacent perforations of the respective members of the series, and means for collectively circumferentially adjusting the plural series of members concentrically with the lens axis independent of their correlative adjustment.

13. A device of the nature disclosed combining a holder adapted to be clamped upon a lens circumference, a series of different colored similarly apertured transparent members, supported upon said holder to partially eclipse the lens area not including its axis and interchangeable to differentially overlap each other for color modification and expose various non-overlapping areas of said members.

14. A device of the nature disclosed combining a series of different-colored transparent members, similarly apertured, adapted to be supported before the lens to partially eclipse the lens area, not including its axis, the members capable of overlapping each other with their apertures in registry.

15. A device of the nature disclosed combining a holder adapted to be clamped upon the lens circumference, and concentrically adjustable around the lens, a series of different-colored apertured transparent members, coincidentally pivoted upon said holder and overlapping each other to partially eclipse the lens area not including its axis with the apertures of each member in registry in the overlapping portions thereof, said members swingingly adjustable to definite relative positions for differential overlap, and to expose various non-overlapping areas of said members.

In testimony whereof, I have hereunto set my hand.

EDWIN A. HOWLAND.

Witnesses:
 OLIVER B. KAISER,
 EMMA SPENCER.